(12) United States Patent
Lauter et al.

(10) Patent No.: US 7,639,799 B2
(45) Date of Patent: Dec. 29, 2009

(54) CRYPTOGRAPHICALLY PROCESSING DATA BASED ON A CASSELS-TATE PAIRING

(75) Inventors: Kristin E. Lauter, La Jolla, CA (US); Anne Kirsten Eisentraeger, Ann Arbor, MI (US)

(73) Assignee: Microsoft Corporation, Redmond, WA (US)

( * ) Notice: Subject to any disclaimer, the term of this patent is extended or adjusted under 35 U.S.C. 154(b) by 879 days.

(21) Appl. No.: 11/011,289

(22) Filed: Dec. 14, 2004

(65) Prior Publication Data

US 2006/0129800 A1 Jun. 15, 2006

(51) Int. Cl.
*H04L 9/30* (2006.01)
*H04L 9/32* (2006.01)

(52) U.S. Cl. .................................. 380/30; 713/176
(58) Field of Classification Search .................. None
See application file for complete search history.

(56) References Cited

U.S. PATENT DOCUMENTS

| 2002/0062330 | A1 | 5/2002 | Paar et al. | |
|---|---|---|---|---|
| 2003/0081785 | A1* | 5/2003 | Boneh et al. | 380/277 |
| 2003/0182554 | A1 | 9/2003 | Gentry et al. | |

OTHER PUBLICATIONS

McCallum, William. On the Shafarevich-Tate group of the jacobian of a quotient of the Fermat curve. Oct. 1988. Springer Berlin/Heidelberg. vol. 93, No. 3. http://www.springerlink.com/content/pn8357642r5p2152/.*

Flach, "A generalisation of the Cassels-Tate pairing" Journal Fur Die Reine Und Angewandte Mathematik, vol. 412, 1990, pp. 113-127.

Maas, "Pairing-Based Cryptography", Master's Thesis at Technische Universitat Eindhoven, Department of Mathematics and Computing Science, Jan. 2004, pp. 1-91.

Poonen et al., "The Cassels-Tate pairing on polarized abelian varieties" Annals of Mathematics, 150, 1999, pp. 1109-1149.

Stein, William A., "Shafarevich-Tate Groups of Nonsquare Order", In Modular Curves and Abelian Varieties Barcelona Conference Proceedings, Brikhauser Progress in Mathematics 224, Jul. 2003, pp. 277-289.

EPO Communication with Search Report dated Feb. 21, 2005, from counterpart EP patent application, European Patent Application No. 05 110 688.8, 4 pages.

* cited by examiner

*Primary Examiner*—Gilberto Barron, Jr.
*Assistant Examiner*—Martin Jeriko P San Juan
(74) *Attorney, Agent, or Firm*—Lee & Hayes, PLLC (57) ABSTRACT

Systems and methods for cryptographically processing data as a function of a Cassels-Tate pairing are described. In one aspect, a Shafarevich-Tate group is generated from a cohomology group. A Cassels-Tate pairing is determined as a function of elements of the Shafarevich-Tate group. Data is then cryptographically processed as a function of the Cassels-Tate pairing.

32 Claims, 5 Drawing Sheets

CRYPTOGRAPHICALLY PROCESSING DATA BASED ON A CASSELS-TATE PAIRING

TECHNICAL FIELD

The systems and methods of this specification relate to cryptographic processing.

BACKGROUND

Existing pairing based cryptographic systems use Weil or Tate pairings evaluated at points on an elliptic curve or abelian variety. For a fixed natural number m, the Weil pairing $e_m$ is a bilinear map that takes as input two m-torsion points on an elliptic curve, and outputs an m th root of unity.

SUMMARY

Systems and methods for cryptographically processing data based on a Cassels-Tate pairing are described. In one aspect, a Shafarevich-Tate group is generated from a cohomology group. A Cassels-Tate pairing is determined as a function of elements of the Shafarevich-Tate group. Data is then cryptographically processed as a function of the Cassels-Tate pairing.

BRIEF DESCRIPTION OF THE DRAWINGS

In the Figures, the left-most digit of a component reference number identifies the particular Figure in which the component first appears.

DETAILED DESCRIPTION

Overview

The systems and methods for cryptographically processing data based on a Cassels-Tate pairing on a Shafarevich-Tate group provide an alternative to all pairing-based systems that use the Weil or Tate pairings evaluated at points on an elliptic curve or abelian variety. Additionally, the systems and methods have applications in all pairing applications on the Shafarevich-Tate group.

Although not required, the systems and methods for cryptographically processing data based on a Cassels-Tate pairings are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware. These and other aspects of the systems and methods for cryptographically processing data based on a Cassels-Tate pairing are now described in greater detail.

An Exemplary System

Figure 1:
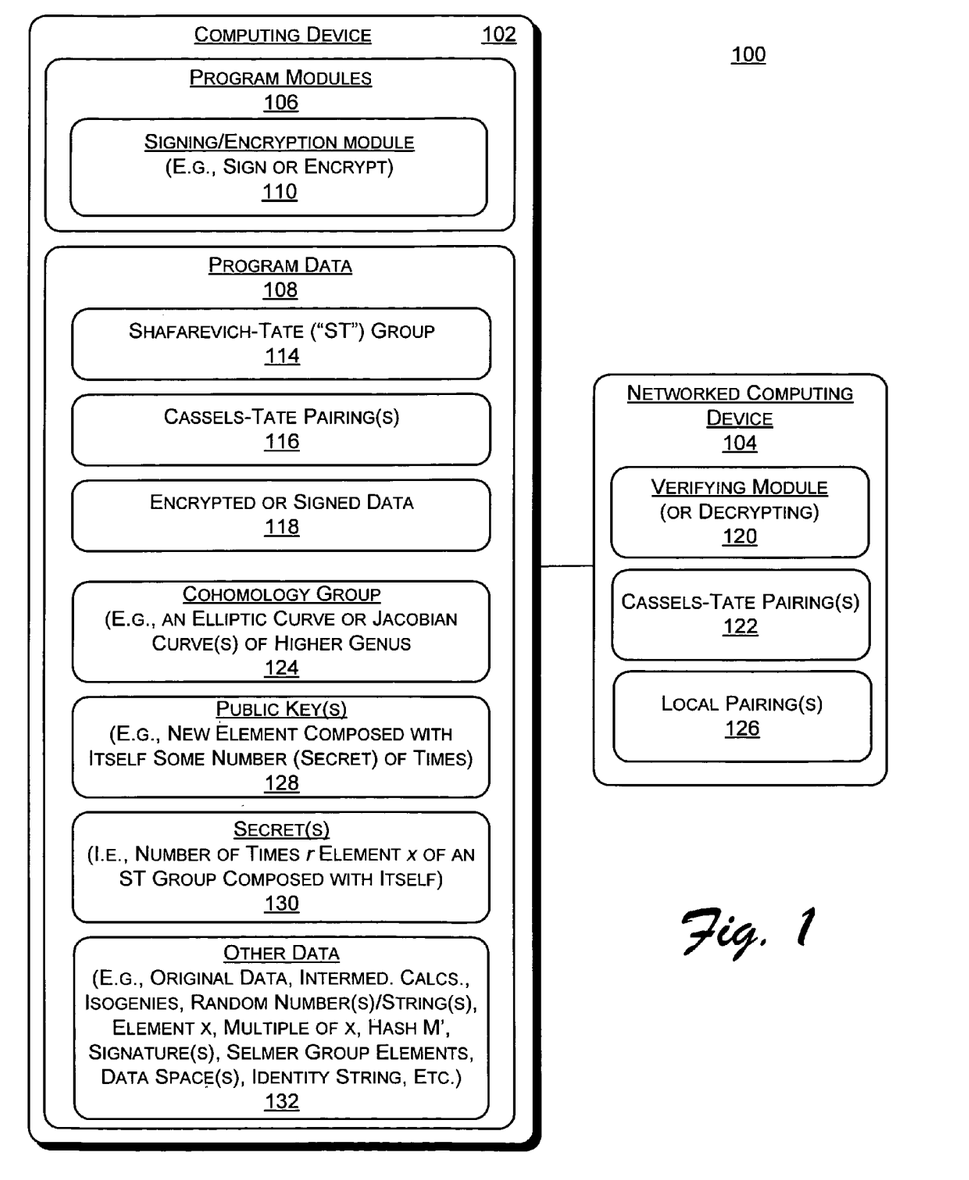
FIG. 1 illustrates an exemplary system for cryptographically processing data based on a Cassels-Tate pairing.

FIG. 1 illustrates an exemplary system 100 for cryptographically processing data based on a Cassels-Tate pairing. System 100 provides an alternative to pairing-based systems based on the Weil or Tate pairings evaluated at points on an elliptic curve or abelian variety. System 100 uses the group of points on the Shafarevich-Tate group of an elliptic curve or abelian variety, combined with the Cassels-Tate pairing on this group. System 100 may implement the operations for Cassels-Tate pairing in a cryptosystem using any one of many known pairing-based cryptographic protocols. For example, in one implementation, system 100 implements protocols based on identity-based cryptographic algorithms such as those directed to signatures (plain, blind, proxy, ring, undeniable, etc), encryption, authenticated encryption, broadcast encryption, encryption with keyword search, batch signatures, key agreement (plain, authenticated, group, etc.), trust authorities and public key certification, hierarchical cryptosystems, threshold cryptosystems and signatures, chameleon hash and signatures, authentication, applications and systems, or the like.

In other implementation(s), system 100 for cryptographic processing based on a Cassels-Tate pairing implements protocols based on access control, key agreement, non-interactive key distribution, credentials (anonymous, hidden, self-blindable), secret handshakes, provably secure signatures, short signatures, aggregate, ring, and verifiably encrypted signatures, blind and partially blind signatures, proxy signatures, undeniable signatures, signcryption, multisignatures and threshold signatures, limited-verifier and designated-verifier signatures, threshold cryptosystems, hierarchical and role-based cryptosystems, chameleon hash and signatures, verifiable random functions, strongly insulated encryption, intrusion-resilient encryption, certificate-less PKC, al, traitor tracing, or the like.

System 100 includes computing device 102 coupled over a network to a networked computing device 104. Computing device 102 includes program module(s) 106 and program data 108. Program modules 106 include, for example, signing/encrypting module 110 to respectively encrypt or sign original data (a respective portion of "other data" 132) using: (a) a group of points on a Shafarevich-Tate group 114 of an elliptic curve or abelian; and, (b) an associated Cassels-Tate pairing 116. For purposes of illustration, original data that has respectively been signed or encrypted by signing/encrypting module 110 is shown in the program data portion of computing device 102 as encrypted or signed data 118. Networked computing device 104 of FIG. 1 also includes program modules and program data. For example, networked computing device 104 includes verifying/decrypting module 120 to respectively decrypt or verify encrypted or signed data 118 as a function of a Cassels-Tate pairing 122 that is generated by verifying/decrypting module 120 as a function of elements of a Shafarevich-Tate group 114. These and other aspects of system 100 are now described in greater detail.

Shafarevich-Tate Group

Shafarevich-Tate group 114 is a set of objects such as elements in a subgroup of a cohomology group 124. Shafarevich-Tate group 114 provides security to system 100 as a function of the hardness of discrete log in the Shafarevich-Tate group 114. Shafarevich-Tate group 114 is defined as follows. If K is a number field 124, denote by $M_K$ the set of nonequivalent valuations on K. Denote by $K_v$ a completion of K with respect to the metric induced by a prime v and by $k_v$ the residue field. In general, if f: G→G' is a morphism of groups denote its kernel by $G_f$. If $\phi: A \to B$ is an isogeny of abelian varieties, denote by $\hat{A}_\phi$ the kernel of $\phi$, and by $\hat{\phi}$ the dual isogeny $\hat{B} \to \hat{A}$. For a field K and a smooth commutative K-group scheme G, we write $H^i(K,G)$ to denote the group cohomology $H^i(\text{Gal}(K_s/K), G(K_s))$, where $K_s$ is a fixed separable closure of K.

In view of the above, Shafarevich-Tate group 114 of an abelian variety is defined. Let A be an abelian variety over a number field K. The Shafarevich-Tate group 114 of A, which is defined below, measures the failure of the local-to-global principle for certain torsors. A Shafarevich-Tate group 114 of A over K is $$III(A/K) := \text{Ker}\left(H^1(K, A) \to \prod_{v \in M_k} H^1(K_v, A)\right).$$

Cassels-Tate Pairing

Let A be an abelian variety defined over a number field K. The Cassels-Tate ("CT") pairing (e.g., 116 or 122), CT(*,*), is a bilinear, anti-symmetric, non-degenerate pairing (modulo the divisible subgroup) of $III(A/K)$ with $III(\hat{A}/K)$ taking values in Q/Z. The CT pairing is written as a sum of local pairings (e.g., local pairings 126). Each local pairing is evaluated by a combination of evaluations of the Tate pairing, the Weil pairing, and the Hilbert symbol with respect to m. Special cases of the pairing on A, an elliptic curve, can be evaluated more simply using techniques such as those described in C. Beaver, "5-torsion in the Shafarevich-Tate group of a family of elliptic curves", J. Number Theory, 82(1):25-46, 2000, which is hereby incorporated by reference.

More particularly, let A be an abelian variety over a number field K with dual $\hat{A}$. The Cassels-Tate pairing CT(*,*) is a pairing such that $$CT: III(A/K) \times III(\hat{A}/K) \to Q/Z,$$

which is non-degenerate modulo the divisible group. A definition in a special case follows. (For a general definition see William G. McCallum, "On the Shafarevich-Tate group of the Jacobian of a quotient of the Fermat curve", Invent. Math., 93(3):637-666, 1988 (I, Proposition 6.9). For other equivalent definitions see also Bjorn Poonen and Micheal Stoll, "The Cassels-Tate pairing on polarized abelian varieties", Ann. of Math. (2), 150(3):1109-1149, 1999.) Let $\phi, \psi$ be isogenies of A over K. The restriction of the Cassels-Tate pairing is restricted to the kernels of $\phi$ and $\hat{\psi}$.

There are exact sequences $$0 \to A_\psi(\overline{K}) \to A_{\phi\psi}(\overline{K}) \xrightarrow{\psi} A_\phi(\overline{K}) \to 0 \text{ and}$$

$$0 \to A_\phi(\overline{K}) \to A(\overline{K}) \xrightarrow{\phi} A(\overline{K}) \to 0.$$

If * is a global cohomology class, cocycle, or cochain, we write $*_v$ for the corresponding local object. Let $a \in III(A/K)_\phi$ and $a' \in III(K,\hat{A})_{\hat{\psi}}$. We define CT(a,a'). Choose elements b and b' of $H^1(K,A_\phi)$ and $H^1(K,\hat{A}_{\hat{\psi}})$ mapping to a and a' respectively. For each v, a maps to zero in $H^1(K_v, A)$, and so we can lift $b_v$ to an element $b_{v,1} \in H^1(K_v, A_{\phi\psi})$ that is in the image of $A(K_v)$. Suppose that a is divisible by $\psi$ in $H^1(K,A)$, say $a = \psi a_1$, and choose an element $b_1 \in H^1(K, A_{\phi\psi})$ mapping to $a_1$.

Then $b_{v,1} - b_{1,v}$ maps to zero under $H^1(K_v, A_{\phi\psi}) \to H^1(K_v, A_\phi)$, and so it is the image of an element $c_v$ in $H^1(K_v, A_\psi)$. Then we define CT(a,a') to be $$CT(a, a') = \sum_{v \in M_k} inv_v(c_v \cup b_v'),$$

where the cup-product is induced by the Weil pairing $$e_\psi: A_\psi \times \hat{A}_\psi \to G_m.$$

By the cup-product induced by the Weil pairing we mean the composition $$H^1(K_v, A_{\hat{\psi}}) \times H^1(K_v, \hat{A}_{\hat{\psi}}) \to H^2(K_v, A_\psi \otimes \hat{A}_{\hat{\psi}}) \xrightarrow{e_\psi} H^2(K_v, G_m)$$

of the regular cup-product with the map on cohomology induced by the Weil pairing. The map $inv_v$ is the canonical map $H^2(K_v, G_m) \to Q/Z$. (The image of $inv_v$ lies inside $m^{-1}Z/Z$.)

A Cassels-Tate pairing 122 is described as a sum of local pairings. More particularly, suppose that the map of Galois modules $$\psi: A_{\phi\psi}(\overline{K}) \to A_\phi(\overline{K})$$

has a Galois invariant section $$s: A_\phi(\overline{K}) \to A_{\phi\psi}(\overline{K}).$$

Then we can take $a_1 = s_* a$. We will now express the Cassels-Tate pairing 122 as a sum of local pairings. Let $III := III(A/K)$ and $III' := III(\hat{A}/K)$. Let $S_\phi$ be the Selmer group, which is a subset of $H^1(K, A_\phi)$ defined by the exact sequence $$0 \to A(K)/\phi A(K) \to S_\phi \to III_\phi \to 0.$$

Also, let $S_{\hat{\psi}}$ be the $\hat{\psi}$-Selmer group, which is defined by the corresponding exact sequence for $\hat{\psi}$. We can now lift the Cassels-Tate pairing to $S_\phi \times S_{\hat{\psi}}$. Then the pairing on the Selmer group is described as a sum of local pairings. The motivation for this is the following. We will apply this for $\phi = \psi$. There is small chance of computing $III_\phi$ directly, but we may be able to compute the Selmer group $S_\phi$. The lift of the Cassels-Tate pairing to the Selmer group $S_\phi \times S_{\hat{\phi}}$ is trivial on elements coming from $A(K)/\phi A(K)$. So if the Cassels-Tate pairing on $S_\phi \times S_{\hat{\phi}}$ is nontrivial, then we must have nontrivial $\phi$-torsion in III.

By the definition of III, the third vertical map in $$0 \to A(K)/\phi A(K) \to S_\phi \to III \to 0$$
$$\downarrow \quad \quad \downarrow \quad \quad \downarrow$$
$$0 \to A(K_v)/\phi A(K_v) \to H^1(K_v, A_\phi) \to 0$$

is 0. Hence we get a map $1_{v,\phi}: S_\phi \to A(K_v)/\phi A(K_v)$. We use $1_{v,\phi}$ to map the Selmer group into the local groups $A(K_v)/\phi A(K_v)$. We can now define a local pairing $$\langle,\rangle_v^{\phi,\psi}: A(K_v)/\phi A(K_v) \times \hat{A}(K_v)/\hat{\psi}\hat{A}(K_v) \to Q/Z$$

such that for b ∈ $S_\phi$ and b' ∈ $S'_\psi$ we have $$CT(b, b') = \sum_{v \in M_K} \langle l_{v,\phi}(b), l_{v,\hat{psi}}(b') \rangle_v^{\phi,\psi}.$$

Definition of the Local Pairing

To define the local pairing (e.g., local pairings 126), "$\langle,\rangle_v^{\phi,\psi}$", we consider the following diagram $$
\begin{array}{ccc}
A_\phi(K_v)/\psi\, A_{\phi\psi}(K_v) & & \\
\downarrow & & \downarrow \\
A(K_v)/\psi\, A(K_v) & \xrightarrow{i_\psi} & H^1(K_v, A_\psi) \\
\downarrow \phi & & \downarrow \\
0 \longrightarrow A(K_v)/\phi\psi\, A(K_v) & \xrightarrow{i_{\phi\psi}} & H^1(K_v, A_{\phi\psi}) \\
\downarrow & & \downarrow \psi \\
0 \longrightarrow A(K_v)/\phi A(K_v) & \xrightarrow{i_\phi} & H^1(K_v, A_\phi).
\end{array}
$$

Let $x \in A(K_v)/\phi A(K_v)$, $x' \in \hat{A}(K_v)/\hat{\psi}\hat{A}(K_v)$. Let $x_1$ be a lifting of x to $A(K_v)/\phi\psi A(K_v)$. Then $i_{\phi\psi}(x_1)$ and $s.i_\phi(x)$ both have the same image in $H^1(K_v,A_\phi)$, hence $(i_{\phi\psi}(x_1) - s.i_\phi(x))$ is the image of an element $c_v \in H^1(K_v, A_\psi)$. Define $\langle x, x' \rangle_v^{\phi,\psi} = \text{inv}_v[c_v \cup i_{\hat{\psi}}(x')]$.

The local pairing $\langle,\rangle_v^{\phi,\psi}$ is a bilinear pairing of abelian groups. The Cassels-Tate pairing 122 on $S_\phi \times S'_{\hat{\psi}}$ may be expressed as a sum of local pairings as in McCallum (McC88 p. 640)

$$CT(b, b') = \sum_{v \in M_K} \langle l_{v,\phi}(b), l_{v,\phi}(b') \rangle_v^{\phi,\psi},$$

and the following lemma there reduces the above sum to a finite sum: if v is a complex Archimedean valuation, or if v is non-archimedean, A has good reduction modulo the maximal ideal of v, and $v(\deg(\phi)\deg(\psi))=0$, then $\langle,\rangle_v^{\phi,\psi}$ is trivial.

Figure 2:
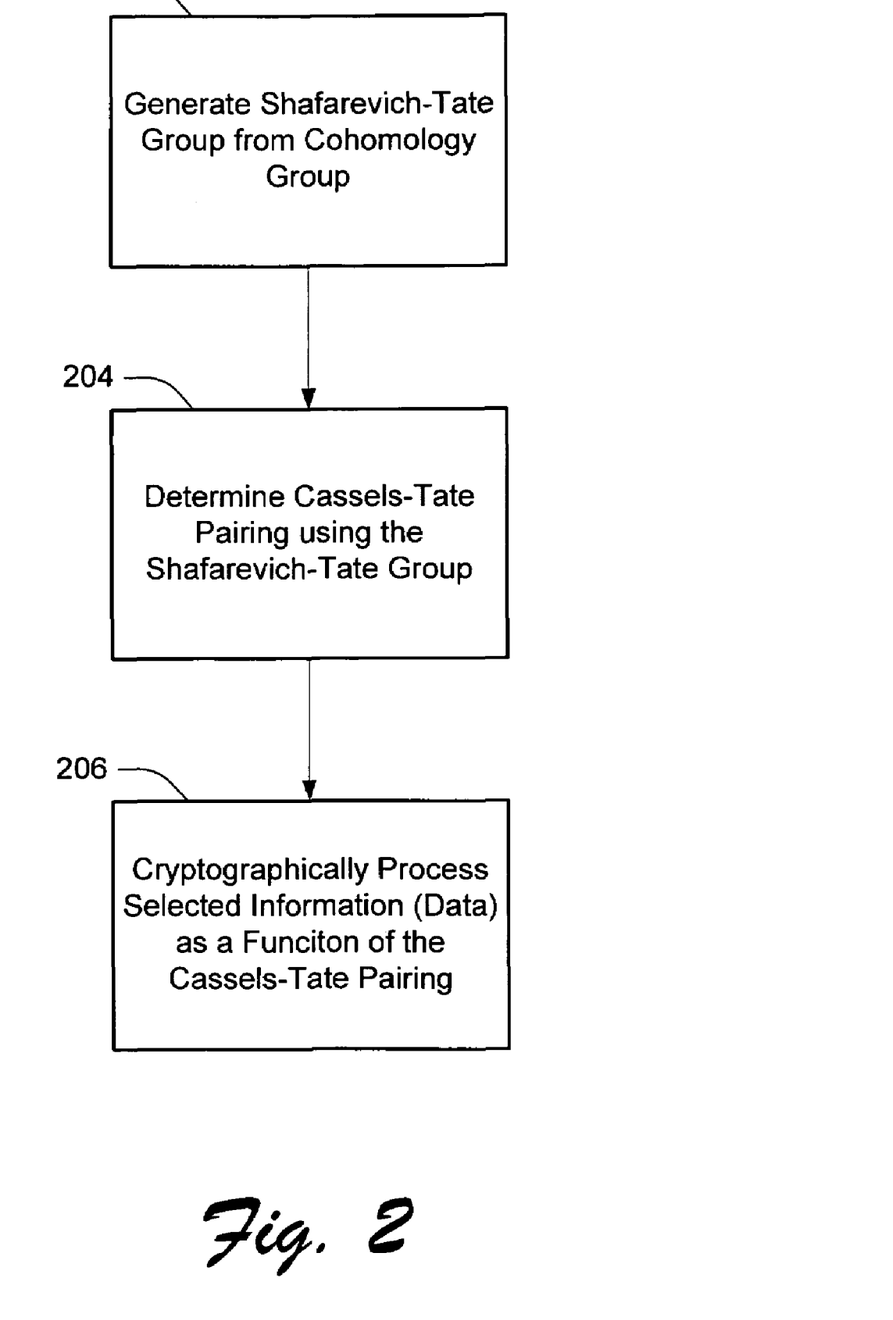
FIG. 2 shows an exemplary procedure to cryptographically process data based on a Cassels-Tate pairing.
Figure 3:
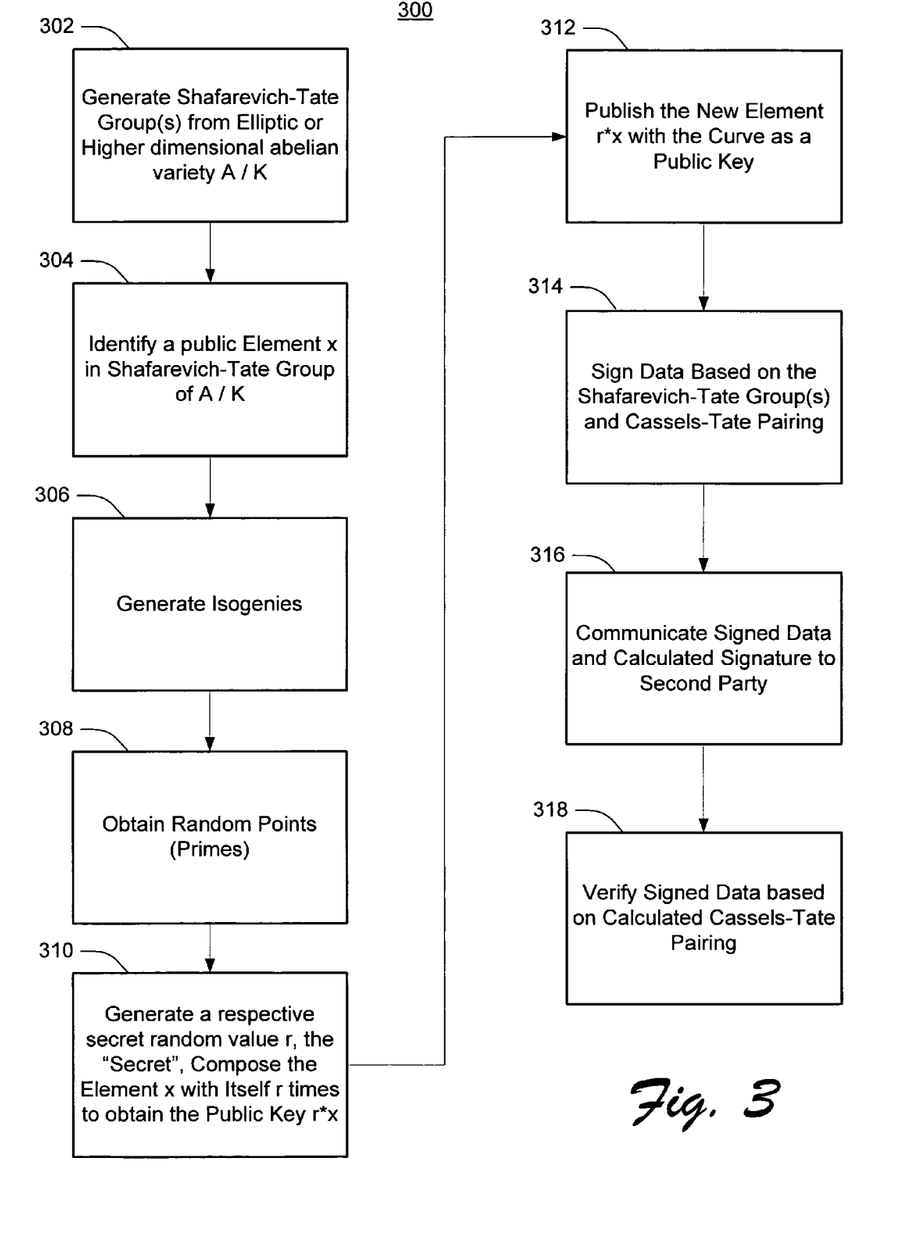
FIG. 3 shows an exemplary procedure to digitally sign data using a Cassels-Tate pairing.

We now describe in reference to FIG. 2, and then in reference to FIG. 3, how Cassels-Tate pairings are used to cryptographically process select data.

An Exemplary Procedure to Cryptographically Process Data

FIG. 2 shows an exemplary procedure 200 to cryptographically process data using a Cassels-Tate pairing. The operations of procedure are described with respect to components of FIG. 1. The left-most digit of a component reference number identifies the particular figure in which the component first appears.

At block 202, signing/encrypting module 110 generates Shafarevich-Tate group 114 (FIG. 1) from cohomology group 124 and abelian variety A over a number field K. At block 204, signing/encrypting module 110 determines a Cassels-Tate pairing (see "other data" 132) based on the Shafarevich-Tate group 114 and a secret, r, which is the number of times that an element x of the Shafarevich-Tate group 114 was composed with itself to obtain the public key, r*x. At block 206, the selected information (e.g., original data) is cryptographically processed as a function of the determined Cassels-Tate pairing. For example, signing/encrypting module 110 encrypts or signs the data as a function of the determined Cassels-Tate pairing. Analogously, verifying/decrypting module 120 respectively decrypts or verifies the data as a function of a generated Cassels-Tate pairing. An exemplary procedure for signing data and verifying signed data using a Cassels-Tate pairing is described below in reference to FIG. 3.

The particular pairing-based cryptology algorithm selected at block 206 to process (e.g., sign or encrypt, and analogously verify or decrypt) the data is arbitrary and a function of the particular algorithm selected for implementation. For example, in one implementation, operations of block 206 use an identity-based encryption algorithm as described below in reference to FIG. 4, or alternatively, an algorithm based on key issuing, signatures (plain, blind, proxy, ring, undeniable, etc.), encryption, authenticated or broadcast encryption, etc., to cryptographically process the data. In another implementation, block 206 uses an algorithm based on key agreement, key distribution, signatures (e.g., short or group signatures, etc.), etc., to cryptographically process the data. In yet a different implementation, block 206 uses a different pairing-based cryptographic algorithm to cryptographically process the data.

An Exemplary Procedure for Signing Data Using a Cassels-Tate Pairing

FIG. 3 shows an exemplary procedure 300 to cryptographically sign data using a Cassels-Tate pairing. The particular pairing-based cryptology algorithm selected to sign the data is arbitrary and a function of the particular cryptology architecture selected for implementation. The operations of procedure 300 are described with respect to components of FIG. 1. The left-most digit of a component reference number identifies the particular figure in which the component first appears.

In this exemplary implementation, signing/encrypting module 110, which in this implementation is a signing module, and so referred to as such, implements a signature scheme. At block 302, signing module 110 generates Shafarevich-Tate group 114 from cohomology group 124 an abelian variety A over a number field K. At block 304, signing module 110 selects and makes public an element x in III(A/K), in the Shafarevich-Tate group 114 of A. At block 306, signing module 110 generates two isogenies, ϕ and ψ, of degree m, from A to A (e.g., via integer multiplication). There are numerous known techniques that can be used to generate the isogenies. At block 308, signing module 110 obtains two random points, P and P', generators for the kernels of $A_\psi$ and $\hat{A}_{\hat{\psi}}$, where $\hat{\psi}$ is the dual isogeny $\hat{A} \to \hat{A}$.

Any two parties (e.g., Alice and Bob) that desire to encrypt or sign original data and/or decrypt or verify associated encrypted or signed data 118, and/or establish a common secret, generate respective public keys 128. At block 310, a party that wants to generate a respective public key 128 generates a respective secret random number, r, and composes x with itself in the Shafarevich-Tate group 114 r times to generate a new element (the $r^{th}$ multiple of x, r*x). The number r is a user's (e.g., party A or party B) secret 130. The secret 130 is not shared. At block 312, signing/encrypting module 110 publishes this new element as a public key 128.

At block 314, signing module 110 signs original data using the Shafarevich-Tate group(s) 114 to generate signed data 118. For example, in one implementation, when signing module implements a signature scheme, signing module 110 utilizes hash function, h, from the data space $\{0, 1\}^n$ into $III(\hat{A}/K)$ to sign original data, M (e.g., a plaintext message). The data space $\{0, 1\}^n$ is the set of bit-strings of some length n. Similarly, the data space $\{0, 1\}^*$ is the set of bit-strings of some length *. This is accomplished by computing the hash of M, h(M) as an element of $III(\hat{A}/K)$, then taking the r th multiple r*h(M) to obtain the signature σ=r*h(M). For purposes of illustration, the hash of M, represented as M', Cassels-Tate pairing, and the associated signature σ are shown as a respective portion of "other data" 132.

At block 316, signing module 110 sends M together with the signature σ to a target entity such as to an application executing on networked computing device 104. The application implements or otherwise accesses logic implemented by verifying/decrypting module 120. At block 318, and responsive to receiving M and signature σ, verifying/decrypting module 120, which is this implementation is a verifying module, validates or verfies the signature of M by hashing M, computing Cassels-Tate pairing 122, CT(r*x,h(M)), and comparing it with CT(x,σ). If they are the same then the signature on the message is deemed valid.

Evaluating a Cassels-Tate Pairing

This section indicates how, in certain cases, operations of verifying/decrypting module 120 at block 318 can compute a Cassels-Tate pairing 122 explicitly. In this implementation, attention is focused on the special case where an explicit formula is provided for the pairing 122. Exemplary notation is also provided.

1. It is assumed that the abelian variety A is an elliptic curve E defined over a number field K. Then E is canonically isomorphic to its dual $\hat{E}$.
2. It is assumed that there exists an isogeny φ of E of degree p which is defined over K. We will let ψ be the dual isogeny, $\psi := \hat{\phi}$. Then $E_\phi \cong Z/pZ$ and $E_\psi \cong Z/pZ$.
3. It is assumed that the full p-torsion of E is defined over K. Let $P \in E(K)$ be a generator for the kernel of ψ, and let $P' \in E(K)$ be a generator for the kernel of $\phi = \hat{\psi}$.
4. It is assumed that the map $\psi : E_p \to E_\phi$ has a Galois invariant section $s : E_\phi \to E_p$.
5. Let s' be the dual section. Then we let Q:=s'P'.

Since we have fixed φ and ψ we will from now on refer to the local pairings simply as $\langle,\rangle_v$.

Exemplary Local Pairing in Terms of Hilbert Norm Residue Symbol

Let φ be the isogeny of E of degree p. As above, let $P \in E(K)$ be a generator for the kernel of φ. Let $D_P$ a divisor on E over K which represents P, and let $f_P \in K(E)$ be a function satisfying $$(f_P) = pD_P.$$

We have the following lemma.

Lemma 3: Let $R \in E(K)$, and let $D_R$ be a divisor equivalent to (R)−(O) and not meeting the support of $D_P$.
1. We have $f_P(\phi D_R) \in (K^*)^p$.
2. Let g be a function whose divisor div g has disjoint support from $D_P$. We have $f_P(\text{div } g) \in (K^*)^p$.
3. If $D'_P$ is defined over K and linearly equivalent to $D_P$, and $f'_P \in E(K)$ is such that $(f'_P) = mD'_P$, then $f_P \equiv f'_P g^p \mod K^*$ for some $g \in K(E)$.

Proof. Statement 2, immediately above, follows from Weil reciprocity. It follows from Lemma 3 that the map $f_P$ gives us a well defined map $$\iota_P : E(K)/\phi E(K) \to K^*/(K^*)^p$$

This is just the Tate pairing. It follows from (3) that this map only depends on P, not on the divisor chosen to represent it. On the other hand, since P is rational over K, we have a Galois map $$E_\phi \to \mu_p, \; a \mapsto e_\phi(a, P),$$

which induces a map $$j_P : H^1(K, E_\phi) \to H^1(K, \mu_p) = K^*/(K^*)^p,$$

where the equality is the map that comes from Kummer theory.

Lemma 4: We have $j_P \circ i_\phi = \iota_P$. Here, $i_\phi$ is the map from the short exact sequence of cohomology $i_\phi : E(K)/\phi E(K) \to H^1(K, E_\phi)$. The symbol "∘" denotes composition of maps. Now let P,P' and Q be as above, i.e. P is a generator for the kernel of ψ, P' is a generator for the kernel of $\phi = \hat{\psi}$ and Q:=s'P', where s' is the dual section. Before we proceed consider the following two definitions.

Definition 5. The Hilbert norm residue symbol $(,)_p$ is a map $(,)_p : K_v^*/(K_v^*)^p \times K_v^*/(K_v^*)^p \to \mu_p$. It is defined by $(x,y)_p := (x^{1/p})^{([\bar{y}, K_v] - 1)}$. Here $\bar{y}$ is any element of K* mapping to y and $[\bar{y}, K_v]$ denotes the Artin symbol.

Definition 6. Let $\zeta, \zeta' \in \mu_p$. Let $\text{Ind}_\zeta(\zeta')$ be the unique element $u \in 1/m \; Z/Z$ such that $\zeta^{\mu u} = \zeta'$. We can now prove the following proposition.

Proposition 7: Under the identifications $$H^1(K_v, \mu_p) = K_v^*/(K_v^*)^p$$

and $$H^2(K_v, \mu_p \otimes \mu_p) = H^2(K_v, \mu_p) \otimes \mu_p = (p^{-1}Z/Z) \otimes \mu_p = \mu_p$$

the Hilbert norm residue symbol $(,)_p$ may be identified with the cup product pairing $$H^1(K_v, \mu_p) \times H^1(K_v, \mu_p) \to H^2(K_v, \mu_p \otimes \mu_p).$$

Proof. This follows from the discussion in Serre, Local Fields, Chapter XIV. We can now prove the following theorem that relates the local pairing to the Hilbert symbol.

Theorem 8: Let $x, y \in E(K_v)/\phi E(K_v)$. We have $\langle x, y \rangle_v = \text{Ind}_{e_\psi(P,P')}[(\iota_Q(x_1), \iota_P(y))_p]$, (1), where $x_1$ is any lifting of x to $E(K_v)/pE(K_v)$. Proof. See, Theorem 2.6 in McCallum.

Representation of elements in the Selmer group $S_\phi$ are now described. Let v be the distinguished place as above where the local pairing is nontrivial. To each element $\xi \in S_\phi$, we associate a point $T \in E(K_v)/\phi E(K_v)$ by letting $T := 1_{v,\phi}(\xi)$. Here $1_{v,\phi}$ is as in Theorem 1 and as described with respect to the Cassels-Tate pairing as local pairings. This element $T \in E(Q_p)$ uniquely represents the element $\xi \in S_\phi(E/K)$.

Evaluating the local pairing $\langle S, T \rangle_v$ for $S, T \in K_v = Q_p$ is now described. By Theorem 8 the local pairing 126 can be evaluated as an application of two Tate pairings 122 and one Hilbert symbol (see, "other data" 132). In one implementation, projective coordinates are used to avoid divisions, and denominator cancellation techniques are used to evaluate the Tate pairing.

Exemplary Identity-Based Encryption

Figure 4:
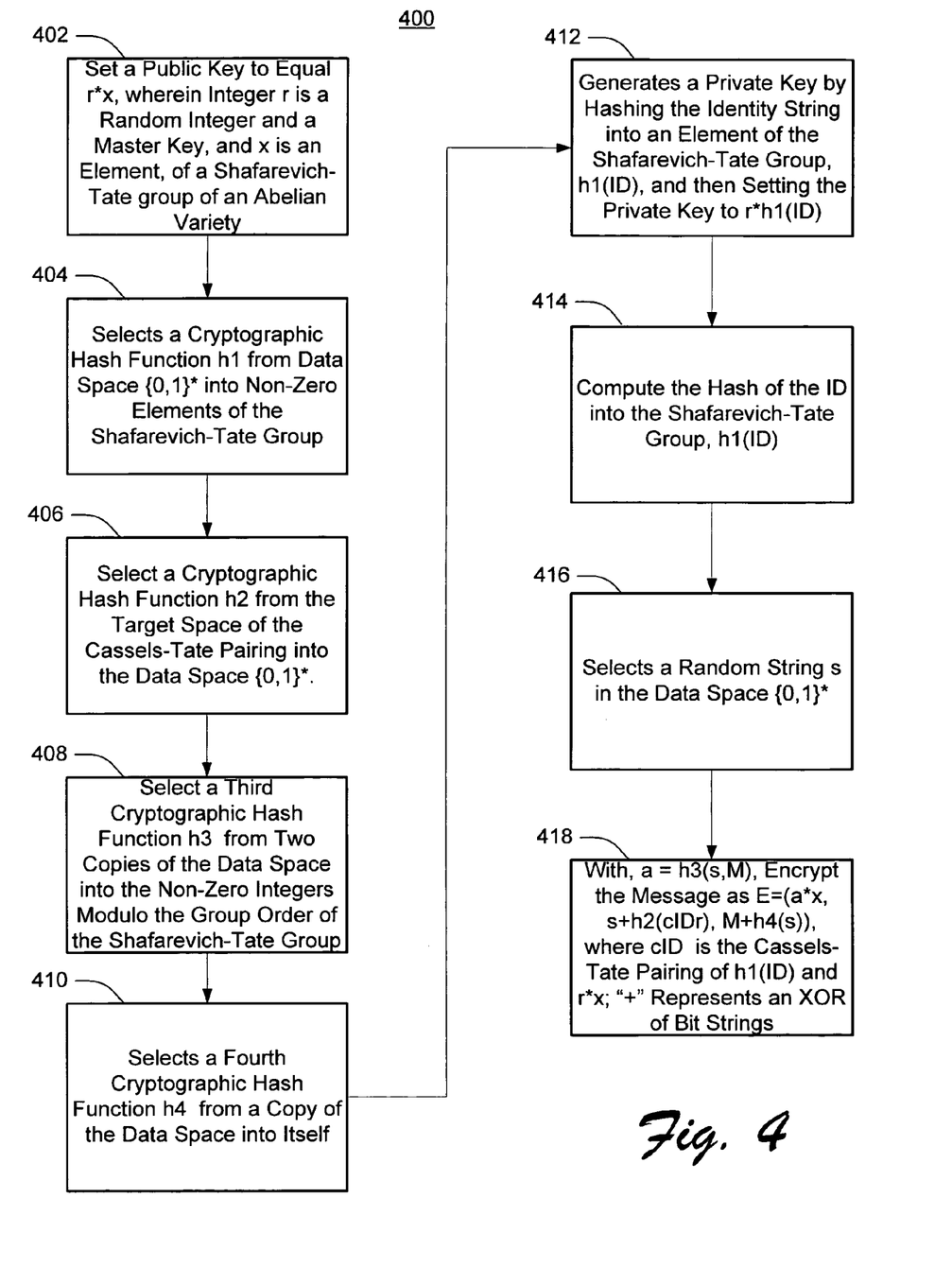
FIG. 4 shows an exemplary procedure for identity-based encryption using Cassels-Tate pairing.

FIG. 4 shows an exemplary procedure 400 of system 100 for identify-based encryption using the Cassels-Tate pairing on the Shafarevich-Tate group of an abelian variety. The operations of procedure 400 are described with respect to components of FIG. 1. The left-most digit of a component reference number identifies the particular figure in which the component first appears. Operations of procedure 400 are based on the following: let x be an element, possibly a generator, of the Shafarevich-Tate group 114 of the dual of an abelian variety, and let r be a random integer less than the group order of the Shafarevich-Tate group.

At block 402, a program module 106, for example, signing/encrypting module 110 sets a public key 128 to equal to r*x. In the implementation of exemplary procedure 400, module 110 is an encryption module and is referred to as such with respect to the procedure. The integer r is the master key. At block 404, the program module 106 selects a cryptographic hash function $h_1$ from the data space $\{0,1\}^*$ into the non-zero elements of the Shafarevich-Tate group. At block 406, the program module 106 selects a cryptographic hash function $h_2$ from the target space of the Cassels-Tate pairing 116 into the data space $\{0,1\}^*$.

At block 408, the program module 106 selects a third cryptographic hash function $h_3$ from two copies of the data space $\{0,1\}^*$ into the non-zero integers modulo the group order of the Shafarevich-Tate group 114. At block 410, the program module 106 selects a fourth cryptographic hash function $h_4$ from a copy of the data space $\{0,1\}^*$ into itself. At block 412, and for a given identity string, ID in $\{0,1\}^*$, an authority for the system 100 (e.g., a program module 106 such as encrypting module 110) generates a corresponding private key by hashing the identity string into an element of the Shafarevich-Tate group 114, $h_1(ID)$ and then setting the private key to be $r^*h_1(ID)$. For purposes of illustration, such an identity string and the private key are shown as respective portions of "other data" 132.

At block 414, to encrypt a message M in the data space $\{0,1\}^*$ using the public key ID, the program module 106 computes the hash of ID into the Shafarevich-Tate group, $h_1(ID)$. The message M is a respective portion of "other data" 132. At block 416, the program module 106 selects a random string s in the data space $\{0,1\}^*$. At block 418, let $a=h_3(s,M)$. The program module 106 encrypts the message 118 as follows $E=(a^*x, s+h_2(c_{ID}{}^a), M+h_4(s))$, where $c_{ID}$ is the Cassels-Tate pairing 116 of $h_1(ID)$ and $r^*x$; the + symbol represents an XOR operation of bit strings.

Decryption of the message can be accomplished as follows. The decryptor 120 possesses the private key, $D=r^*h_1(ID)$, associated to the identity string ID. The decryptor receives cipher text $E=(F,G,H)$. The decryptor sets $s=G+h_2(CT(D,F))$. Then the decryptor sets the message M equal to $M=H+h_4(s)$. Then the decryptor sets $a=h_3(s,M)$, and tests that the received value F is equal to $a^*x$. If not, the decryptor rejects the message.

An Exemplary Operating Environment

Figure 5:
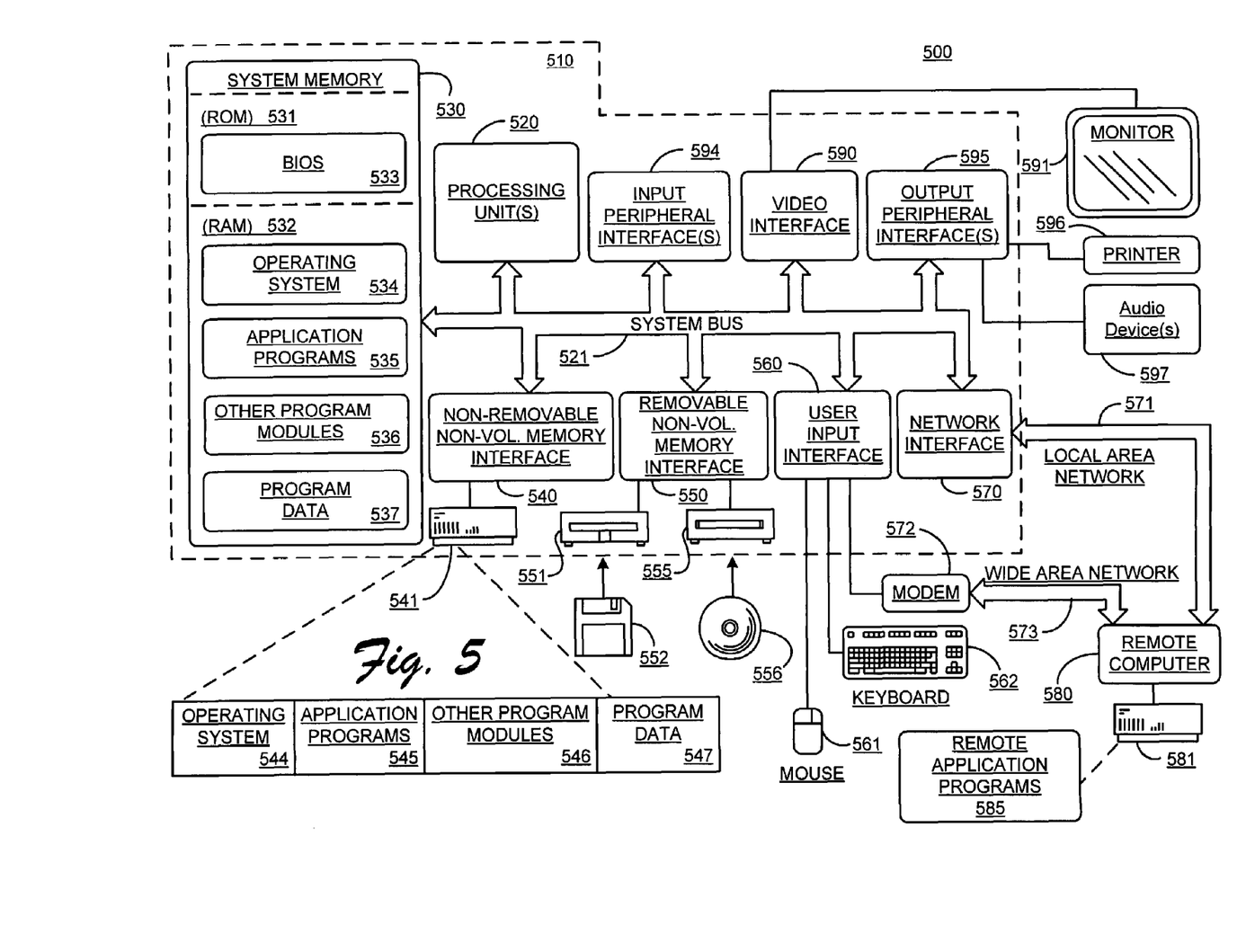
FIG. 5 illustrates an example of a suitable computing environment in which cryptographic processing data based on a Cassels-Tate pairing may be fully or partially implemented.

FIG. 5 illustrates an example of a suitable computing environment in which cryptographic processing data based on a Cassels-Tate pairing may be fully or partially implemented. Exemplary computing environment 500 is only one example of a suitable computing environment for the exemplary system of FIG. 1 and exemplary operations of FIGS. 2-4, and is not intended to suggest any limitation as to the scope of use or functionality of systems and methods the described herein. Neither should computing environment 500 be interpreted as having any dependency or requirement relating to any one or combination of components illustrated in computing environment 500.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 5, an exemplary system for cryptographically processing data based on a Cassels-Tate pairing includes a general purpose computing device in the form of a computer 510 implementing, for example, system 100 of FIG. 1. The following described aspects of computer 510 are exemplary implementations of computing devices 102 and/or 104 of FIG. 1. Components of computer 510 may include, but are not limited to, processing unit(s) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 510 typically includes a variety of computer-readable media. Computer-readable media can be any available media that can be accessed by computer 510 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Application programs 535 includes, for example program modules of computing devices 102 or 104 of FIG. 1. Program data 537 includes, for example, program data of computing devices 102 or 104 of FIG. 1. Operating system 544, application programs 545, other program modules 546, and program data 547 are given different numbers here to illustrate that they are at least different copies.

A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB).

A monitor 591 or other type of display device is also connected to the system bus 521 via an interface, such as a video interface 590. In addition to the monitor, computers may also include other peripheral output devices such as printer 596 and audio device(s) 597, which may be connected through an output peripheral interface 595.

The computer 510 operates in a networked environment using logical connections to one or more remote computers, such as a remote computer 580. In one implementation, remote computer 580 represents computing device 102 or networked computer 104 of FIG. 1. The remote computer 580 may be a personal computer, a server, a router, a network PC, a peer device or other common network node, and as a function of its particular implementation, may include many or all of the elements described above relative to the computer 510, although only a memory storage device 581 has been illustrated in FIG. 5. The logical connections depicted in FIG. 5 include a local area network (LAN) 581 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example and not limitation, FIG. 5 illustrates remote application programs 585 as residing on memory device 581. The network connections shown are exemplary and other means of establishing a communications link between the computers may be used.

CONCLUSION

Although the systems and methods for Cassels-Tate pairing in cryptography have been described in language specific to structural features and/or methodological operations or actions, it is understood that the implementations defined in the appended claims are not necessarily limited to the specific features or actions described. For example, although signing/encryption module 110 (FIG. 1) and verifying/decrypting module 120 (FIG. 1) are shown on different respective computing devices (i.e., devices 102 and 104), in another implementation, logic associated with these program modules can be implemented on a single computing device 102. In another example, and although the systems and methods for Cassels-Tate pairing have been described in exemplary signing and identity-based implementations, the systems and methods are also applicable to all pairings-based applications on the Shafarevich-Tate group such as those described previously.

In yet another alternate implementation, the public element x can be chosen from the Shafarevich-Tate group of the dual of A, and the messages M can be hashed into the Shafarevich-Tate group of A. Similarly for the Identity-Based Encryption and other applications, the roles of A and the dual of A can be switched.

Accordingly, the specific features and operations of system 100 are disclosed as exemplary forms of implementing the claimed subject matter.

The invention claimed is:

1. A computer implemented method comprising:
generating a Shafarevich-Tate group from a cohomology group;
determining a Cassels-Tate pairing based on elements of the Shafarevich-Tate group;
cryptographically processing data based on the Cassels-Tate pairing, wherein the cryptographic processing selects a public element x from the Shafarevich-Tate group of a dual of A, where A is defined as an abelian variety, and messages M are hashed into the Shafarevich-Tate group of A; and communicating the cryptographically processed data, the cryptographically processed data comprising signed data and a calculated signature, to a second party whereby the second party is configured to verify signed data based on a calculated Cassels-Tate pairing.

2. A computer implemented method as recited in claim 1, wherein the cohomology group is associated to an abelian variety selected from an elliptic curve or a Jacobian variety of a higher genus curve.

3. A computer implemented method as recited in claim 1, wherein the Cassels-Tate pairing is a sum of local pairings.

4. A computer implemented method as recited in claim 1, wherein the cryptographic processing is a signature-based verification scheme or an identity-based encryption scheme.

5. A computer implemented method as recited in claim 1, wherein the cryptographic processing is based on the Shafarevich-Tate group and a dual of A, wherein roles of A and the dual of A are switched.

6. A computer implemented method as recited in claim 1, wherein cryptographically processing further comprises signing the data by hashing the data with hashing function h acting on data space $\{0, 1\}^*$, the data being hashed into $III(Â/K)$, wherein $\{0, 1\}^*$ represents a set of bit-strings of a length *, and wherein $III(Â/K)$ is a Shafarevich-Tate group of A over K where K comprises a number field.

7. A computer implemented method as recited in claim 1, wherein cryptographically processing further comprises:
selecting an element x from the Shafarevich-Tate group;
selecting a random number r;
composing the element x, r times with itself to generate a public key; and
wherein r is a maintained as a secret.

8. A computer implemented method as recited in claim 1, wherein cryptographically processing further comprises:
selecting an element x from the Shafarevich-Tate group;
composing the element x, r times with itself to generate a public key, r being the secret; and
publishing the element x, the public key r*x, wherein r*x denotes the rth multiple of x, and the abelian variety so that the data can be decrypted or verified by an independent entity.

9. A computer implemented method as recited in claim 1, wherein the Cassels-Tate pairing is evaluated on different inputs and their values are compared, and wherein the method further comprises:
receiving a public key generated from a secret determined as a function of an element of the Shafarevich group; and
decrypting or verifying the data as a function of the public key and the Cassels-Tate pairing.

10. A computer implemented method as recited in claim 1, wherein the signature a σ=r*h(M) and message M are transmitted, and wherein the method further comprises verifying the data by:
(a) hashing the data; and
(b) computing a second Cassels-Tate pairing, CT(r*x,h (M)); and
(c) comparing the second Cassels-Tate pairing with the first Cassels-Tate pairing, CT(x,σ).

11. A computer implemented method as recited in claim 1, wherein cryptographically processing further comprises signing the data by:
computing a hash h of the data such that h(the data) is an element of $III(Â/K)$;
determining an r th multiple r*h(the data), wherein r is a random number; and
evaluating the Cassels-Tate pairing to obtain signature σ=r*h(M).

12. A computer-readable storage medium encoded with computer-executable instructions that, when executed, configure a computing system to perform a method comprising:
generating a Shafarevich-Tate group from a cohomology group;
determining a Cassels-Tate pairing based on elements of the Shafarevich-Tate group;
cryptographically processing data based on the Cassels-Tate pairing, wherein the cryptographic processing selects a public element x from the Shafarevich-Tate group of a dual of A, where A is defined as an abelian variety, and messages M are hashed into the Shafarevich-Tate group of A; and
communicating the cryptographically processed data, comprising signed data and a calculated signature, to a second party whereby the second party is configured to verify signed data based on a calculated Cassels-Tate pairing.

13. A computer-readable storage medium as recited in claim 12, wherein the cohomology group is associated to an abelian variety selected from an elliptic curve or a Jacobian variety of a higher genus curve.

14. A computer-readable storage medium as recited in claim 12, wherein the Cassels-Tate pairing is a sum of local pairings.

15. A computer-readable storage medium as recited in claim 12, wherein the cryptographic processing is a signature-based verification scheme or an identity-based encryption scheme.

16. A computer-readable storage medium as recited in claim 12, wherein the computer-executable instructions for cryptographically processing further comprise instructions for signing the data by hashing the data with hashing function h acting on data space $\{0, 1\}^*$, the data being hashed into $III(Â/K)$, wherein $III(Â/K)$ is a Shafarevich-Tate grourp of A over K where K comprises a number field.

17. A computer-readable storage medium as recited in claim 12, wherein the computer-executable for cryptographically processing further comprise instructions for:
selecting an element x from the Shafarevich-Tate group;
selecting a random number r;
composing the element x, r times with itself to generate a public key; and
wherein r is a maintained as a secret.

18. A computer-readable storage medium as recited in claim 12, wherein the computer-executable for cryptographically processing further comprise instructions for:
selecting an element x from the Shafarevich-Tate group;
composing the element x, r times with itself to generate a public key, r being the secret; and
publishing the element x, the public key r*x and the abelian variety so that the data can be decrypted or verified by an independent entity.

19. A computer-readable storage medium as recited in claim 12, wherein the Cassels-Tate pairing is evaluated on different inputs and their values are compared, and wherein the computer-executable instructions further comprise instructions for:
receiving a public key generated from a secret determined as a function of an element of the Shafarevich group; and
decrypting or verifying the data as a function of the public key and the Cassels-Tate pairing.

20. A computer-readable storage medium as recited in claim 12, wherein the signature σ=r*h(M) and message M are transmitted, and wherein the computer-program instructions further comprise instructions for verifying the data by:

(a) hashing the data; and
(b) computing a second Cassels-Tate pairing, $CT(r*x, h(M))$; and
(c) comparing the second Cassels-Tate pairing with the first Cassels-Tate pairing, $CT(x,\sigma)$.

21. A computer-readable storage medium as recited in claim 12, wherein the computer-executable instructions for cryptographically processing further comprise instructions for signing the data by:
    computing a hash h of the data such that h(the data) is an element of $III(Â/K)$;
    determining an r th multiple r*h(the data), wherein r is a random number; and
    evaluating the Cassels-Tate pairing to obtain signature $\sigma=r*h(M)$.

22. A computing device comprising:
    a processor; and
    a memory encoded with computer-executable instructions that, when executed, direct a computing device to perform a method, the method comprising:
      generating a Shafarevich-Tate group from a cohomology group;
      determining a Cassels-Tate pairing based on elements of the Shafarevich-Tate group;
      cryptographically processing data based on the Cassels-Tate pairing, wherein the cryptographic processing selects a public element x from the Shafarevich-Tate group of a dual of A, where A is defined as an abelian variety, and messages M are hashed into the Shafarevich-Tate group of A; and
      communicating the cryptographically processed data, comprising signed data and calculated signature, to a second party whereby the second party is configured to verify signed data based on a calculated Cassels-Tate pairing.

23. A computing device as recited in claim 22, wherein the cohomology group is associated to an abelian variety selected from an elliptic curve or a Jacobian variety of a higher genus curve.

24. A computing device as recited in claim 22, wherein the Cassels-Tate pairing is a sum of local pairings.

25. A computing device as recited in claim 22, wherein the cryptographic processing is a signature-based verification scheme or an identity-based encryption scheme.

26. A computing device as recited in claim 22, wherein the computer-executable instructions for cryptographically processing further comprise instructions for signing the data by hashing the data with hashing function h acting on data space $\{0, 1\}*$, the data being hashed into $III(Â/K)$, wherein $III(Â/K)$ is a Shafarevich-Tate group of A over K where K comprises a number field.

27. A computing device as recited in claim 22, wherein the computer-executable instructions for cryptographically processing further comprise instructions for:
    selecting an element x from the Shafarevich-Tate group;
    selecting a random number r;
    composing the element x, r times with itself to generate a public key; and
    wherein r is a maintained as a secret.

28. A computing device as recited in claim 22, wherein the computer-executable instructions for cryptographically processing further comprise instructions for:
    selecting an element x from the Shafarevich-Tate group;
    composing the element x, r times with itself to generate a public key, r being the secret; and
    publishing the element x, the public key r*x and the abelian variety so that the data can be decrypted or verified by an independent entity.

29. A computing device as recited in claim 22, wherein the Cassels-Tate pairing is evaluated on different inputs and their values are compared, and wherein the computer-executable instructions further comprise instructions for:
    receiving a public key generated from a secret determined as a function of an element of the Shafarevich group; and
    decrypting or verifying the data as a function of the public key and the Cassels-Tate pairing.

30. A computing device as recited in claim 22, wherein the signature $\sigma=r*h(M)$ and message M are transmitted, and wherein the computer-executable instructions further comprise instructions for verifying the data by:
    (a) hashing the data; and
    (b) computing a second Cassels-Tate pairing, $CT(r*x, h(M))$; and
    (c) comparing the second Cassels-Tate pairing with the first Cassels-Tate pairing, $CT(x,\sigma)$.

31. A computing device as recited in claim 22, wherein the computer-executable instructions for cryptographically processing further comprise instructions for signing the data by:
    computing a hash h of the data such that h(the data) is an element of $III(Â/K)$;
    determining an r th multiple r*h(the data), wherein r is a random number; and
    evaluating the Cassels-Tate pairing to obtain signature $\sigma=r*h(M)$.

32. A computing device comprising:
    generating means to generate a Shafarevich-Tate group from a cohomology group;
    selecting a public element x from the Shafarevich-Tate group of a dual of A;
    determining means to determine a Cassels-Tate pairing based on elements of the Shafarevich-Tate group;
    cryptographically processing means to cryptographically process data based on the Cassels-Tate pairing, wherein the cryptographic processing selects a public element x from the Shafarevich-Tate group of a dual of A, where A is defined as an abelian variety, and messages M are hashed into the Shafarevich-Tate group of A; and
    communicating means to communicate the cryptographically processed data, comprising signed data and calculated signature, to a second party whereby the second party is configured to verify signed data based on a calculated Cassels-Tate pairing.

* * * * *